(12) United States Patent
Goto et al.

(10) Patent No.: US 9,047,408 B2
(45) Date of Patent: Jun. 2, 2015

(54) MONITORING SOFTWARE EXECUTION (71) Applicant: INTERNATIONAL BUSINESS MACHINES CORPORATION, Armonk, NY (US)

(72) Inventors: Mayumi Goto, Ayase (JP); Ken Kumagai, Tokyo (JP); Hirotaka Matsumoto, Zama (JP); Tadahiko Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/196,054

(22) Filed: Mar. 4, 2014

(65) Prior Publication Data

US 2014/0289710 A1 Sep. 25, 2014

(30) Foreign Application Priority Data

Mar. 19, 2013 (JP) ................................. 2013-057283

(51) Int. Cl.
*G06F 11/36* (2006.01)
(52) U.S. Cl.
CPC .................................. *G06F 11/3636* (2013.01)
(58) Field of Classification Search
CPC ....................................... G06F 11/362–11/3696
USPC .................................................. 717/127–135
See application file for complete search history.

(56) References Cited

U.S. PATENT DOCUMENTS

| 5,313,616 | A  | * | 5/1994  | Cline et al. .................... 717/127 |
| 5,852,720 | A  |   | 12/1998 | Gready et al.                            |
| 6,539,501 | B1 | * | 3/2003  | Edwards ......................... 714/45  |
| 7,116,807 | B1 |   | 10/2006 | Brackett                                 |
| 7,281,238 | B2 | * | 10/2007 | Sasaki et al. .................. 717/127 |
| 2003/0056151 | A1 |  | 3/2003 | Makiyama                                 |

(Continued)

FOREIGN PATENT DOCUMENTS

| JP | 1079735 A    | 3/1998 |
| JP | 2002253552 A | 9/2002 |

(Continued)

OTHER PUBLICATIONS

Watterson, C.; Heffernan, D., "Runtime verification and monitoring of embedded systems," Software, IET , vol. 1, No. 5, pp. 172-179, Oct. 2007.*

(Continued)

*Primary Examiner* — Satish Rampuria
(74) *Attorney, Agent, or Firm* — Law Office of Jim Boice (57) ABSTRACT

A method enables a computer to execute software and to monitor software execution, the method comprising: acquiring, by one or more processors, image data of a screen image displayed on a display device while monitored software is executed; acquiring, by one or more processors, peripheral information, wherein the peripheral information is a state of software and hardware in which the software is executed, at a time of acquisition of the image data; and adding, by one or more processors, the peripheral information to the image data and storing the image data having the peripheral information added thereto into a storage device, so that, in response to an image based on the image data being displayed on the display device, a content of the peripheral information acquired by the peripheral information acquiring unit is displayed along with the screen image.

5 Claims, 10 Drawing Sheets

(56) References Cited

U.S. PATENT DOCUMENTS

| | | |
|---|---|---|
| 2005/0197805 A1 | 9/2005 | Eryurek et al. |
| 2006/0069691 A1 | 3/2006 | Kawai |
| 2006/0117299 A1* | 6/2006 | Goldsmith et al. ........... 717/124 |
| 2008/0065928 A1 | 3/2008 | Suzuki et al. |
| 2013/0290934 A1* | 10/2013 | Simon ........................... 717/125 |

FOREIGN PATENT DOCUMENTS

| | | |
|---|---|---|
| JP | 2003091432 A | 3/2003 |
| JP | 2003108403 A | 4/2003 |
| JP | 2003520008 A | 6/2003 |
| JP | 2006106882 A | 4/2006 |
| JP | 2006155641 A | 6/2006 |
| JP | 2007072851 A | 3/2007 |
| JP | 2007526581 A | 9/2007 |
| JP | 2008065668 A | 3/2008 |
| JP | 2008176353 A | 7/2008 |
| JP | 2010244439 A | 10/2010 |
| JP | 2011118695 A | 6/2011 |
| JP | 2011199507 | 10/2011 |
| WO | 0152178 A1 | 7/2001 |

OTHER PUBLICATIONS

Chang-Guo Guo; Xiao-Ling Li; Jun Zhu, "A Generic Model for Software Monitoring Techniques and Tools," Networks Security Wireless Communications and Trusted Computing (NSWCTC), 2010 Second International Conference on , vol. 1, pp. 61-64, Apr. 24-25, 2010.*

Plattner, B., "Real-Time Execution Monitoring," Software Engineering, IEEE Transactions on , vol. SE-10, No. 6, pp. 756-764, Nov. 1984.*

\* cited by examiner

MONITORING SOFTWARE EXECUTION

This application is based on and claims the benefit of priority from Japan (JP) Patent Application 2013-057283, filed on Mar. 19, 2013, and herein incorporated by reference in its entirety.

BACKGROUND

The present invention relates to a tool for monitoring software execution, and to an apparatus, a method and a program for performing screen capturing of an image displayed when monitored software is executed.

In software development, various types of tests are done for functions, user interfaces, and so on provided by the software. As a result of the tests, when a problem is found, a person in charge of the software development (a programmer or the like) or the like analyses the test results, and works out and applies a solution; when required, the software is revised or modified. Accordingly, when a problem is found in the software test, it is desirable to collect data on the conditions of the test, and to provide a person in charge of test result analysis with the data.

For example, known prior art discloses a system in which, when an error occurs in a software evaluation processing, an error report mail is produced and transmitted to the e-mail address of a source administrator, the error report mail containing detailed data on the error and the source file identifier. Other prior art utilizes a process, not directed to software test, by which data needed for trouble analysis is acquired from history data on system operation and then the presence/absence of trouble is analyzed based on the acquired data.

SUMMARY

In one embodiment of the present invention, an apparatus for monitoring software execution comprises: a hardware executing unit executing monitored software; and a hardware monitoring unit monitoring execution of the monitored software by the executing unit, wherein the hardware monitoring unit comprises: an image acquiring unit acquiring image data of a screen image displayed on a display device while the hardware executing unit executes the software; a peripheral information acquiring unit acquiring peripheral information, wherein the peripheral information is information on a state of software and hardware in which the software is executed, and wherein the peripheral information describes the state of the software and the hardware at a time of acquisition of the image data by the image acquiring unit; and a captured image processing unit adding the peripheral information to the image data so that, in response to an image based on the image data acquired by the image acquiring unit being displayed on the display device, content of the peripheral information acquired by the peripheral information acquiring unit is displayed with the screen image.

In one embodiment of the present invention, an apparatus for monitoring software execution comprises: a hardware executing unit executing monitored software; and a hardware monitoring unit monitoring execution of the monitored software by the executing unit, wherein the hardware monitoring unit comprises: an operation history acquiring unit acquiring history data on operations for execution of software used by a user; an image acquiring unit acquiring image data of a screen image displayed on a display device in response to the hardware executing unit executing the software; a peripheral information acquiring unit acquiring peripheral information, wherein the peripheral information is information on a state of the software and hardware in which the software is executed, and wherein the peripheral information describes the state of the software and hardware at a time of acquisition of the image data by the image acquiring unit; and a captured image processing unit adding the peripheral information to the image data so that, in response to an image based on the image data acquired by the image acquiring unit being displayed on the display device, content of the peripheral information acquired by the peripheral information acquiring unit is displayed along with the image, wherein, in response to an error occurring during execution of the software by the executing unit at a time of the image data acquisition by the image acquiring unit, the peripheral information acquiring unit acquires, depending on an error type of the error, information predetermined as peripheral information to be acquired in response to an occurrence of that error type, and wherein, in response to a determination, based on history data acquired by the operation history acquiring unit, that a specific operation has been performed during a predetermined period of time before the image data acquisition by the image acquiring unit, then the peripheral information acquiring unit acquires information predetermined as peripheral information to be acquired when that specific operation is performed.

In one embodiment of the present invention, a method enables a computer to execute software and to monitor software execution, the method comprising: acquiring, by one or more processors, image data of a screen image displayed on a display device while monitored software is executed; acquiring, by one or more processors, peripheral information, wherein the peripheral information is a state of software and hardware in which the software is executed, at a time of acquisition of the image data; and adding, by one or more processors, the peripheral information to the image data and storing the image data having the peripheral information added thereto into a storage device, so that, in response to an image based on the image data being displayed on the display device, a content of the peripheral information acquired by the peripheral information acquiring unit is displayed along with the screen image.

DETAILED DESCRIPTION

As a problem report associated with a software test, the following is generally performed: from among screen images (hereinafter, referred to as a display screen image) by GUI (Graphical User Interface) or the like displayed on a display device during software execution, screen capturing of data of the display screen image at the time of the problem occurrence is performed as one of the measures for identifying where the problem has occurred.

However, when only the display screen image at the time of the problem occurrence is available, it is difficult to properly analyze the present problem due to lack of peripheral information (software execution environment, problem causing process and the like) at the time of the problem occurrence. In this case, the person in charge of test result analysis may ask the person in charge of test execution to reproduce the conditions causing the same problem so that the peripheral information is acquired. However, it may be difficult to reproduce exactly the same conditions causing the problem. Furthermore, even when the same conditions can be reproduced, in order to acquire the peripheral information, it is needed that the software is executed so that the same problem occurs again; in this case, the labor of the person in charge of test execution is increased, lowering the operation efficiency.

To address the above problem, an object of the present invention is to make it possible to easily acquire information for identifying a specific situation at the time of software execution along with peripheral information on the situation.

Embodiments of the present invention will now be described in detail with reference to the accompanying drawings.

System Configuration

Figure 1:
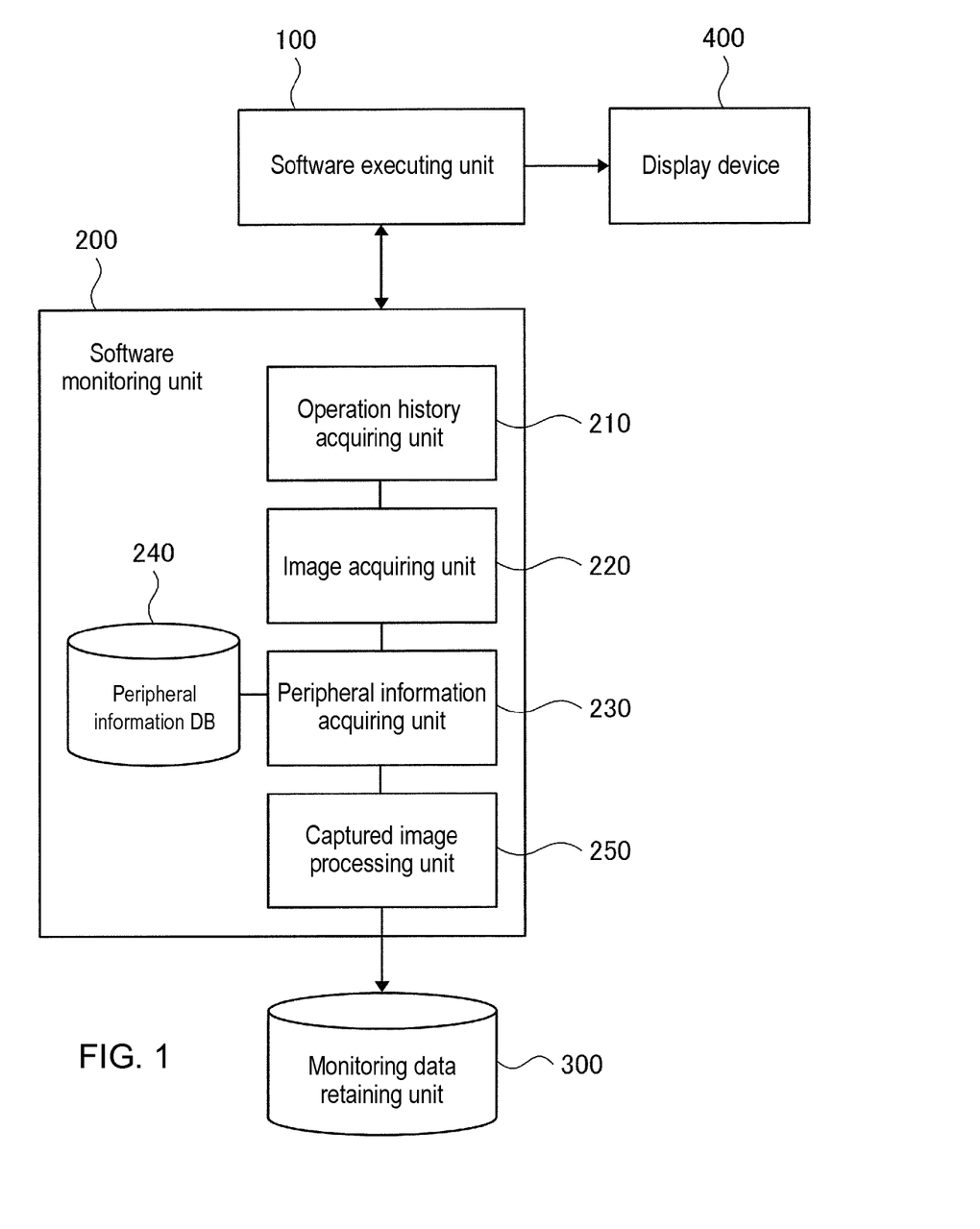
FIG. 1 is a diagram illustrating an exemplary functional configuration of a computer system to which the present embodiment is applied.

FIG. 1 is a diagram illustrating an exemplary functional configuration of a computer system to which the present embodiment is applied.

The system illustrated in FIG. 1 includes a software executing unit 100 which executes software (application program; hereinafter, referred to as monitored software) for implementing a tested system, a software monitoring unit 200 which monitors the execution state of the monitored software, and a monitoring data retaining unit 300 which retains data on monitoring results by the software monitoring unit 200. To this system, as illustrated in FIG. 1, a display device 400 is connected, which is used to display a screen image generated when the software executing unit 100 executes the monitored software. According to the present embodiment, as the monitoring data retained by the monitoring data retaining unit 300, data is produced which is based on image data (captured image) acquired by performing screen capturing of the display screen image displayed on the display device 400 by the software executing unit 100.

The software executing unit 100 executes the monitored software. In this case, the monitored software is executed in a similar environment to when the user of the monitored software actually runs the monitored software. However, according to the present embodiment, the software executing unit 100 executes the monitored software in the environment where the software monitoring unit 200 operates to monitor the operation by the software executing unit 100.

The software monitoring unit 200, as illustrated in FIG. 1, an operation history acquiring unit 210, an image acquiring unit 220, a peripheral information acquiring unit 230, a peripheral information database (DB) 240, and a captured image processing unit 250. The software monitoring unit 200 monitors the state of executing the monitored software by the software executing unit 100 to produce monitoring data, and stores the monitoring data in the monitoring data retaining unit 300.

The operation history acquiring unit 210 acquires and saves history data on user operation for execution of the monitored software by the software executing unit 100 while the software monitoring unit 200 monitors the execution. The operation to be saved as history is set depending on the kind of the monitored software, the detail of the test, and the like. More specifically, examples include a key input operation by a keyboard and an operation by use of a pointing device such as a mouse device.

In order to produce the monitoring data to be stored in the monitoring data retaining unit 300, the image acquiring unit 220 acquires image data of a display screen image displayed on the display device 400 when the software executing unit 100 executes the monitored software. The acquisition of image data by the image acquiring unit 220 is performed responsive to a user operation. When an event requiring acquisition of monitoring data occurs, such as a case where an error has occurred during execution of the monitored software, image data may be automatically acquired responsive to the occurrence of error. The scope of image data to be acquired may be only the display screen image by the monitored software, or when the computer to which the present embodiment is applied has a, so-called, multi-window display function, the scope may be the whole display screen image containing a window displaying the display screen image by the monitored software.

The peripheral information acquiring unit 230 acquires peripheral information at the time of the image acquiring unit 220 acquires image data of a display screen image by the software executing unit 100. The term "peripheral information" as used herein is information on the state of the monitored software and the hardware at the time of the image acquiring unit 220 acquires image data. For example, the peripheral information includes: the history of processing based on the monitored software performed until just before the image data is acquired; resources requested by the monitored software; the amount of memory space; and the usage rate of CPU. The peripheral information to be acquired may be specifically set depending on the kind of monitored software, the detail of test, or the state in which the image data is acquired. The detail of the operation of the peripheral information acquiring unit 230 will be specifically described later.

Stored in the peripheral information DB 240 is a table which the peripheral information acquiring unit 230 consults to acquire peripheral information. In the example illustrated in FIG. 1, the peripheral information DB 240 includes a key table 241, an operation table 242, a peripheral information table 243 and a peripheral information definition table 244. The detail of these tables will be described later.

The captured image processing unit 250 adds the peripheral information acquired by the peripheral information acquiring unit 230 to the image data acquired by the image acquiring unit 220. According to the present embodiment, the peripheral information is added to the image data so that, when an image based on the image data is displayed on the display device 400, the content of the peripheral information is displayed together with this image. Consequently, in reading or analyzing the monitoring results by the software monitoring unit 200, when the image based on the image data is displayed, the peripheral information at the time of that image data is acquired can also be consulted. A specific method of adding the peripheral information to the image data will be specifically described later.

The monitoring data retaining unit 300 retains the image data having the peripheral information added thereto, produced by the captured image processing unit 250 as monitoring results by the software monitoring unit 200. The display device 400, constituted of display equipment such as a liquid crystal display, displays a display screen image produced as a result of executing the monitored software.

Exemplary Configuration of the Peripheral Information DB

The tables constituting the peripheral information DB 240 will be described with reference to FIG. 2 to FIG. 5.

According to the present embodiment, the peripheral information DB 240 includes, as described above, four kinds of tables: the key table 241, the operation table 242, the peripheral information table 243, and the peripheral information definition table 244.

Figure 2:
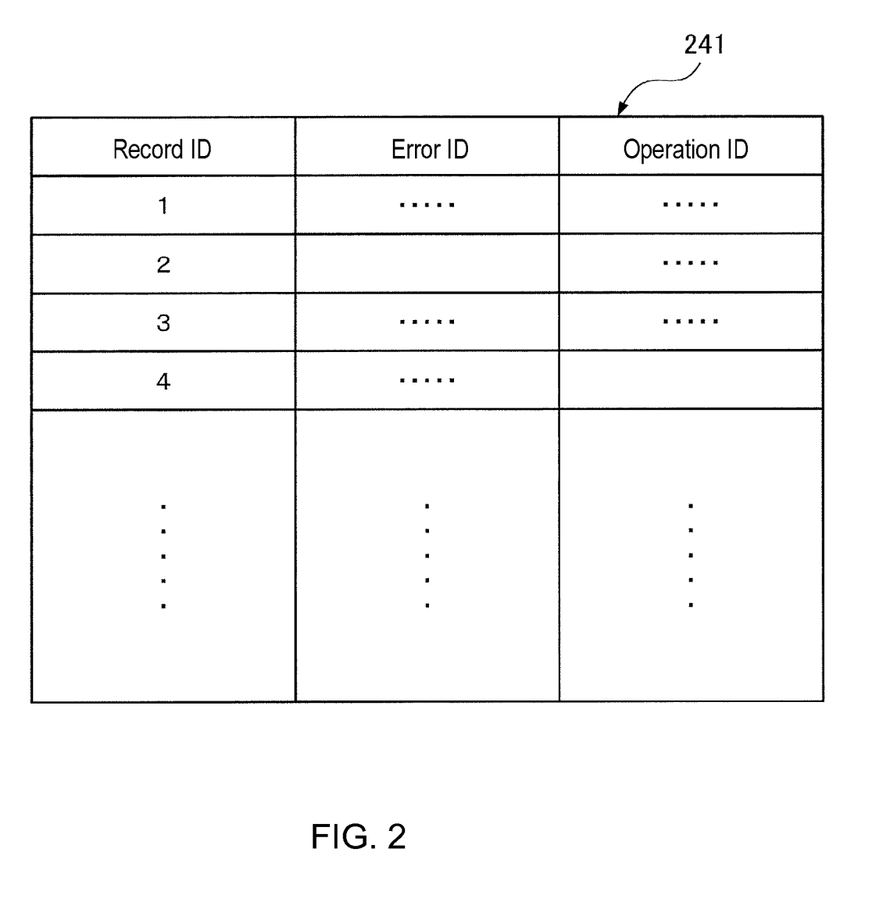
FIG. 2 is a diagram illustrating an exemplary configuration of a key table.

FIG. 2 is a diagram illustrating an exemplary configuration of the key table 241.

IDs (identification data: a record ID, an error ID and an operation ID) are, as illustrated in FIG. 2, registered in the key table 241. The error ID is used to specify an error which occurs during execution of the monitored software. For example, when monitoring data is produced responsive to an error occurrence, the error ID is used to specify this error. The operation ID is used to specify an operation performed by the user when monitoring data is produced. The record ID is used to indicate each of the records in the key table 241. There are three patterns of records in the key table 241: a record with only the error ID registered therein, a record with both the error ID and the operation ID registered therein, and a record with only the operation ID registered therein.

Figure 3:
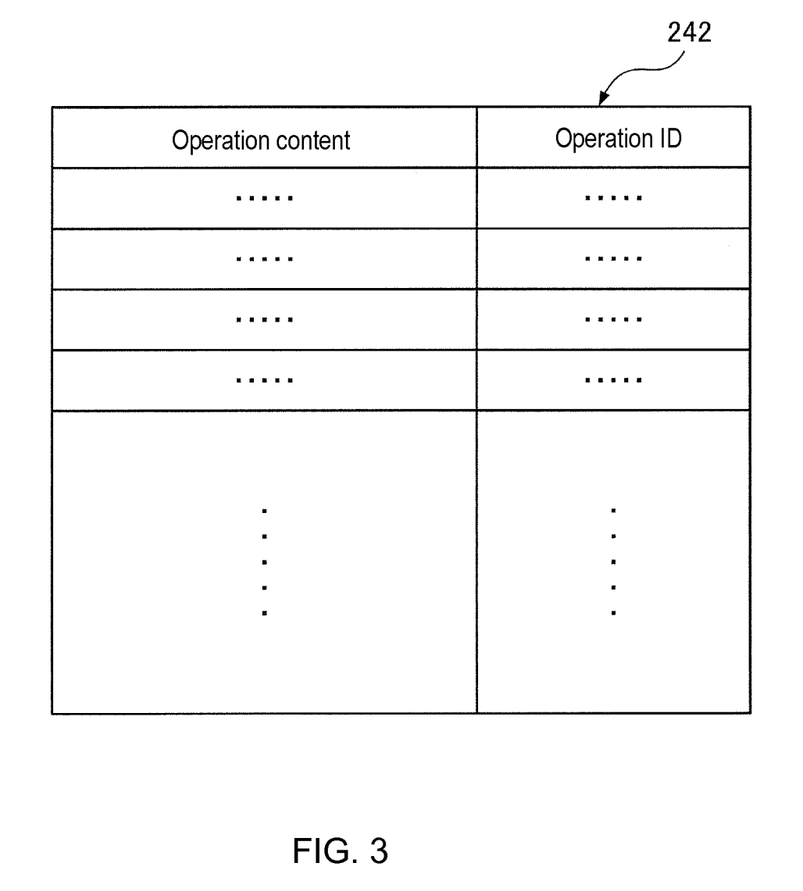
FIG. 3 is a diagram illustrating an exemplary configuration of an operation table.

FIG. 3 is a diagram illustrating an exemplary configuration of the operation table 242.

Registered in the operation table 242 are, as illustrated in FIG. 3, the operation ID and the content of operation associated with the operation ID. There may be two types of operations specified by the operation ID: a single operation and a sequence of operations where multiple operations are performed in a predetermined order. From the content of operation registered in the operation table 242, it is identified that some operation has been performed (positive content) or that some required operation has not been performed (negative content).

Figure 4:
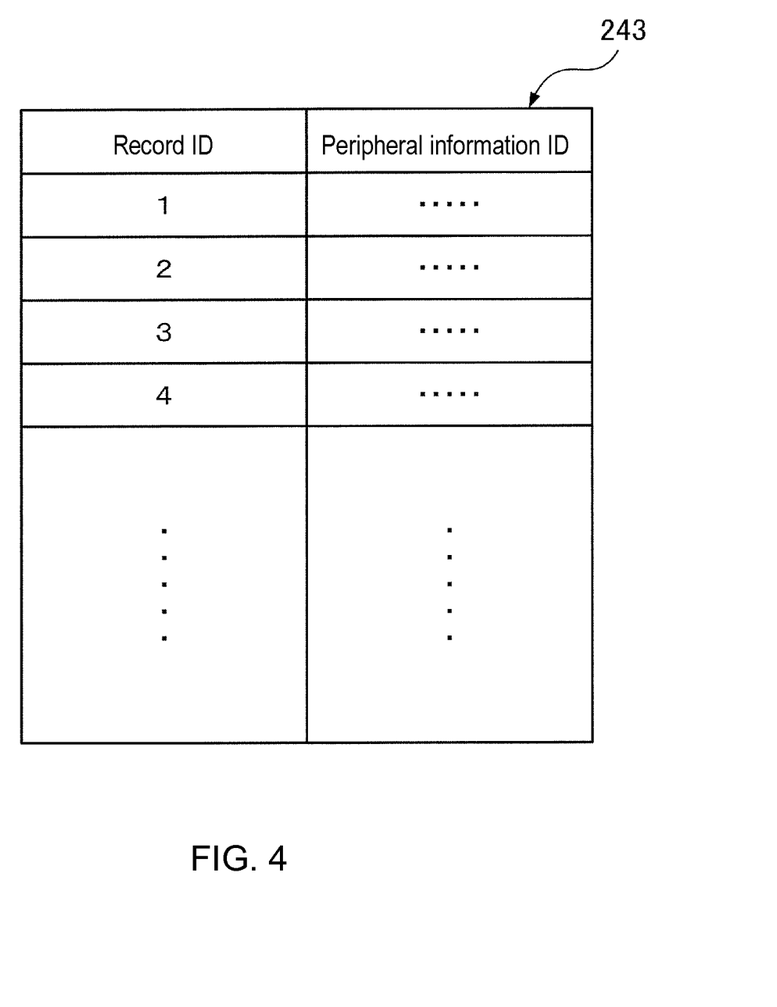
FIG. 4 is a diagram illustrating an exemplary configuration of a peripheral information table.

FIG. 4 is a diagram illustrating an exemplary configuration of the peripheral information table 243.

IDs (a record ID and a peripheral information ID) are, as illustrated in FIG. 4, registered in the peripheral information table 243. This record ID is the same as the record ID registered in the key table 241 illustrated in FIG. 2. The peripheral information ID is used to specify peripheral information to be acquired. Here, in the key table 241, consider a record (record R1) where only the error ID is registered, and a record (record R2) where both the error ID and the operation ID are registered. In this case, registered as the peripheral information ID corresponding to the record ID of the former record (record R1) is one or more peripheral information (peripheral information P1-R1) IDs associated with the occurrence of error (error Er1-R1) specified by the error ID registered in the record R1 of the key table 241.

Registered as the peripheral information ID corresponding to the record ID of the latter record (record R2) is one or more peripheral information (peripheral information P1-R2) IDs associated with the occurrence of error (error Er1-R2) specified by the error ID registered in the record R2 of the key table 241 and with an operation (operation Op1-R2) specified by the operation ID registered in the record R2 of the key table 241.

Here, the peripheral information P1-R2 is equal to a result of subtracting the peripheral information associated only with the occurrence of error (Er1-R2) from the peripheral information to be acquired when the error (Er1-R2) occurs and then a specific operation (Op1-R2) is performed. Consequently, in the actual acquisition of peripheral information, it is needed to acquire both the peripheral information P1-R2 and the peripheral information associated only with the occurrence of error (Er1-R2). For example, when the error Er1-R1 is identical to the error (Er1-R2), it is needed to acquire both the peripheral information P1-R1 and the peripheral information P1-R2.

Figure 5:
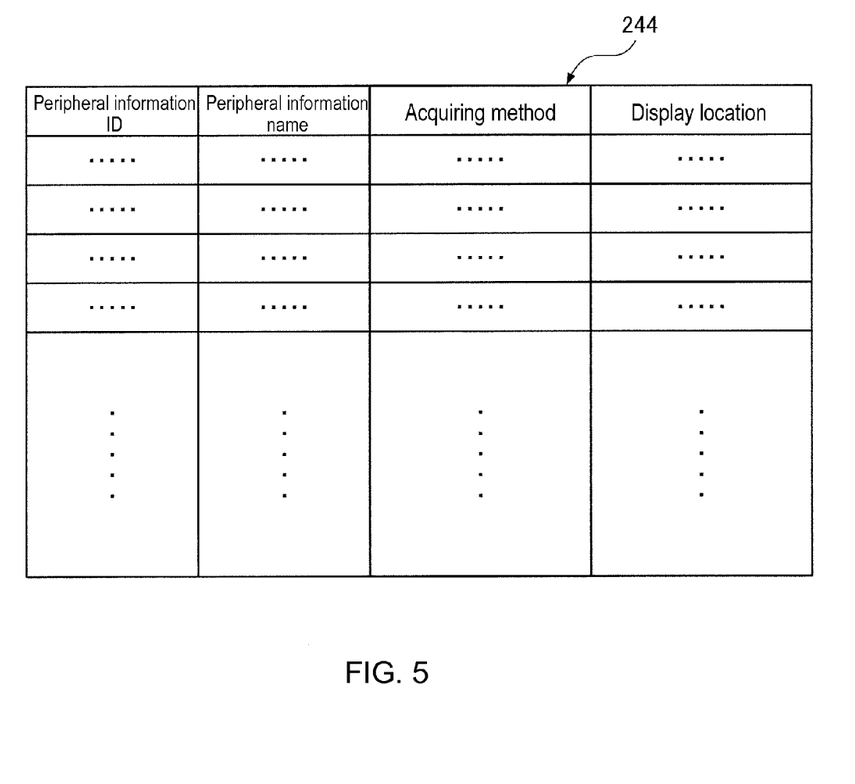
FIG. 5 is a diagram illustrating an exemplary configuration of a peripheral information definition table.

FIG. 5 is a diagram illustrating an exemplary configuration of the peripheral information definition table 244.

Registered in the peripheral information definition table 244 are, as illustrated in FIG. 5, the peripheral information ID, the peripheral information name individually given to the peripheral information ID, the method of acquisition, and the location of display. Registered as the method of acquisition is a specific method for acquiring each of the peripheral information (for example, acquisition by requesting the software executing unit 100 or OS (Operating System)). Registered as the location of display is data for specifying a location where the content of peripheral information is displayed when image data processed by the captured image processing unit 250 is displayed on the display device 400. For example, for the peripheral information associated with a specific object displayed on the display screen image by the monitored software, the vicinity or the like of the specific object is specified. For the peripheral information not associated with a specific object, such as a memory capacity, a specific position on the display screen image (for example, the upper right corner, or a location out of the window with the display screen image displayed by the monitored software.) is specified.

Operation of the Software Monitoring Unit

Figure 6:
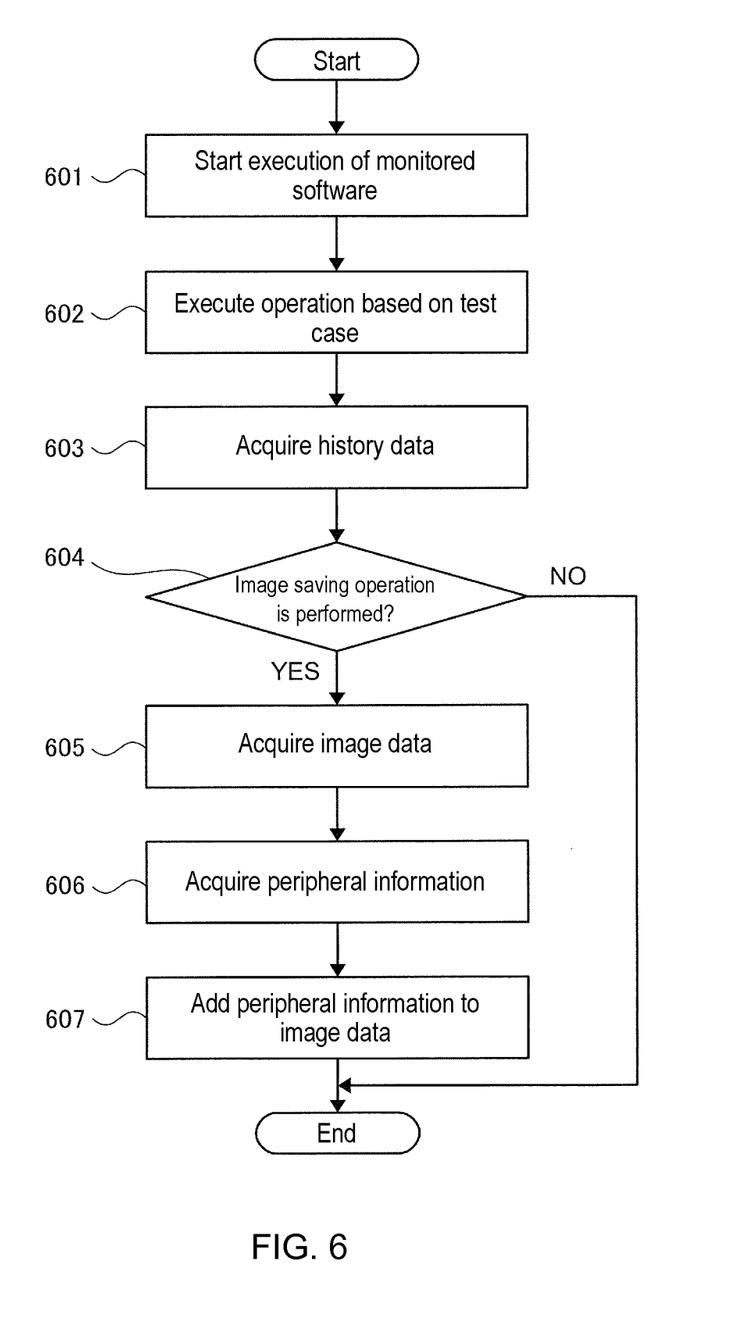
FIG. 6 is a flowchart showing an operation of a software monitoring unit.

FIG. 6 is a flowchart showing an operation of the software monitoring unit 200.

First, the software executing unit 100 starts the execution of the monitored software while the software monitoring unit 200 performs a monitoring operation (step 601). Here, it is sufficient that the software monitoring unit 200 can monitor the execution of the monitored software by the software executing unit 100; thus, the execution start order or the like of the software executing unit 100 and the software monitoring unit 200 is not particularly limited.

In this state, the person in charge of the test performs an operation based on an operating procedure prepared as a test case (step 602). The operation history acquiring unit 210 of the software monitoring unit 200 acquires and saves history data on the performed operation (step 603).

While this operation is performed, the person in charge of the test performs, as required, an operation of saving a screen image displayed on the display device 400 as a result of executing the monitored software (step 604). Responsive to this operation, the image acquiring unit 220 acquires the image data of the display screen image (step 605). Here, the acquisition of image data is performed in such a case as when an error occurs during execution of the monitored software, or when an unusual operation is performed by the software executing unit 100 while an explicit error has not occurred; as the latter case, for example, there is thought to be a case where a request response does not come after a long time has passed, or a case where the processing speed is extremely low compared to the ordinary case. It is noted that the acquisition of image data is not limited to the above described cases where an evidently unusual operation has occurred, and may also be performed through an operation by the person in charge of the test at any time during execution of the monitored software desired by the person in charge of the test.

After the acquisition of image data by the image acquiring unit 220, the peripheral information acquiring unit 230 acquires peripheral information at the time of that acquisition of image data (step 606). Here, the detailed operating procedure of acquiring the peripheral information is different according to the state of the software executing unit 100 at the time of the acquisition of image data; the detail of the difference will be described later.

After the acquisition of peripheral information by the peripheral information acquiring unit 230, the captured image processing unit 250 adds the acquired peripheral information to the image data acquired by the image acquiring unit 220 (step 607). The image data with the peripheral information added thereto is stored as monitoring data into the monitoring data retaining unit 300. In the present embodiment, it is sufficient that, when the image data with the peripheral information added thereto is displayed on the display device 400, the peripheral information added to the image data is displayed; the detailed method for adding the peripheral information to the image data is not particularly limited. However, a processing of inserting as an image, a string of characters representing the peripheral information requires a heavy load. Thus, when a means for registering on a data file, text data to be inserted into an image is available, this means may be used. For example, a JPEG file format may be provided with an area (text field) for describing a text to be displayed on an image. In this case, the peripheral information may be added using this text field.

Figure 7:
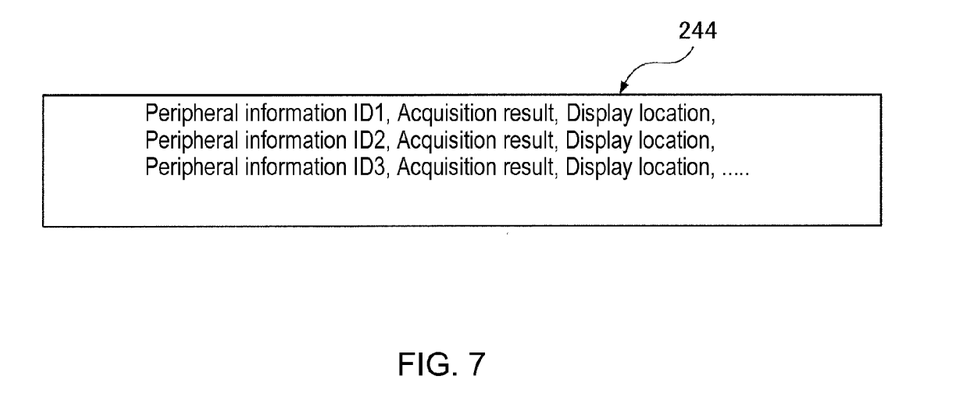
FIG. 7 is a diagram illustrating an example of JPEG text field description.

FIG. 7 is a diagram illustrating an example of JPEG text field description.

In the example illustrated in FIG. 7, "Peripheral information ID", "Acquisition result" and "Display location" for each piece of acquired peripheral information are described in a format coupling these pieces of information together. Here, "Acquisition result" is the content itself of peripheral information acquired by the peripheral information acquiring unit 230. "Display location" is information indicating a location used to display the "Acquisition result" described in the text field when the image data is displayed on the display device 400; this information is obtained from the peripheral information definition table 244 illustrated in FIG. 5.

When the registering means such as the above described JPEG text field is used, the content of "Acquisition result" may be directly described in the text field, or a configuration may be used in which, while the content of "Acquisition result" is stored in a predetermined storage device, a link to the content data of "Acquisition result" stored in this storage device is provided in the text field, allowing reference from the side of the image data.

Exemplary Operation of the Peripheral Information Acquiring Unit

Figure 8:
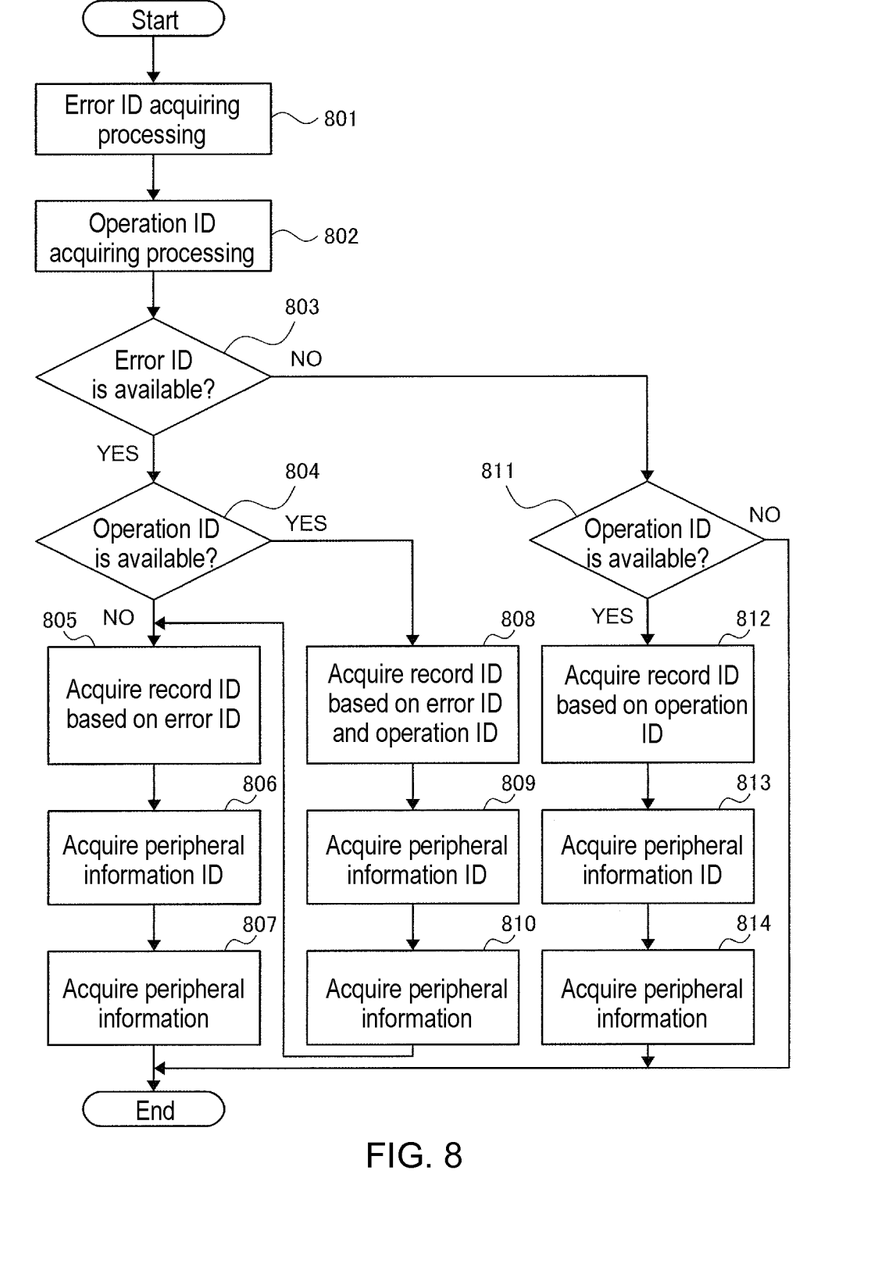
FIG. 8 is a flowchart showing an exemplary operation of a peripheral information acquiring unit.

FIG. 8 is a flowchart showing an exemplary operation of the peripheral information acquiring unit 230.

As illustrated in FIG. 8, after the image acquiring unit 220 has acquired the image data of a display screen image by the monitored software, firstly, the peripheral information acquiring unit 230 performs an error ID acquiring processing (step 801). Usually, when an error occurs during software execution, the occurrence of error is displayed on the display screen image (error display). Thus, the error ID of the error produced can be acquired from the display data of this screen image in the software executing unit 100. Further, when the error display is not provided (for example, when only an alarm tone or a sound message is outputted), also, the error ID of the error produced from the software executing unit 100 can be acquired.

Subsequently, the peripheral information acquiring unit 230 acquires an operation ID (step 802). More specifically, based on the operation history acquired by the operation history acquiring unit 210, the peripheral information acquiring unit 230 takes account of an operation performed during a predetermined period of time before the acquisition of the image data by the image acquiring unit 220. Then, it is determined whether the operation noted corresponds to an operation or a sequence of operations registered in the operation table 242. When there is a corresponding operation or a corresponding sequence of operations registered in the operation table 242, an operation ID associated with that operation or sequence of operations is acquired from the operation table 242.

At step 801, there are two cases: that is, a case where the peripheral information acquiring unit 230 can acquire an error ID, and a case where the peripheral information acquiring unit 230 cannot acquire an error ID. While an explicit error has not occurred, when the image acquiring unit 220 acquires image data and the peripheral information acquiring unit 230 is ready to acquire peripheral information, an error ID cannot be acquired because an error has not occurred. At step 802, there are two cases: that is, a case where the peripheral information acquiring unit 230 can acquire an operation ID, and a case where the peripheral information acquiring unit 230 cannot acquire an operation ID. That is, when an operation performed immediately before the acquisition of image data acquired from the operation history acquiring unit 210 has not been registered in the operation table 242, an operation ID cannot be acquired. Further, depending on the kind of errors produced, there may be an operation which does not cause a problem; in this case, there is no need to acquire an operation ID. Consequently, after the processing at steps 801 and 802, there are four cases: a case where only an error ID has been acquired; a case where both an error ID and an operation ID have been acquired; a case where only an operation ID has been acquired; and a case where neither an error ID nor an operation ID has been acquired.

When only an error ID has been acquired (Yes at step 803 and No at step 804), subsequently, the peripheral information acquiring unit 230 consults the key table 241 to acquire the record ID of a record in which the acquired error ID has been registered (step 805). Then, the peripheral information acquiring unit 230 consults the peripheral information table 243 to acquire a peripheral information ID corresponding to the record ID acquired at step 805 (step 806). Then, the peripheral information acquiring unit 230 consults the peripheral information definition table 244 and acquires peripheral information by use of a peripheral information acquiring method registered in the table 244, corresponding to the peripheral information ID acquired at step 806 (step 807).

Examples of peripheral information acquired by the above operations include a list of processes which have accessed to a program module in which the error has occurred, the version data of this program module, data on the right of access to the program module and to a directory in which the program module exists, the amount of memory space, and the usage rate of CPU.

When an error ID and an operation ID are both acquired (Yes at step 803 and Yes at step 804), subsequently, the peripheral information acquiring unit 230 consults the key table 241 to acquire the record ID of a record in which the acquired error ID and operation ID have been registered (step 808). Then, the peripheral information acquiring unit 230 consults the peripheral information table 243 to acquire a peripheral information ID corresponding to the record ID acquired at step 808 (step 809). Then, the peripheral information acquiring unit 230 consults the peripheral information definition table 244 and acquires peripheral information by use of a peripheral information acquiring method registered in the table 244, corresponding to the peripheral information ID acquired at step 809 (step 810).

Subsequently, the peripheral information acquiring unit 230 consults the key table 241 to acquire the record ID of a record in which only the acquired error ID has been registered (step 805). Then, the peripheral information acquiring unit 230 consults the peripheral information table 243 to acquire a peripheral information ID corresponding to the record ID acquired at step 805 (step 806). Then, the peripheral information acquiring unit 230 consults the peripheral information definition table 244 and acquires peripheral information by use of a peripheral information acquiring method registered in the table 244, corresponding to the peripheral information ID acquired at step 806 (step 807).

In the above description of the exemplary operation, after a sequence of operations (steps 808 to 810) for acquiring peripheral information based on error ID and operation ID, a sequence of operations (steps 805 to 807) for acquiring peripheral information based only on error ID are performed. However, the actual processing procedure is not limited to the above. That is, it is sufficient that the peripheral information based on error ID and operation ID and the peripheral information based only on error ID are both acquired; thus peripheral information based only on error ID may be acquired first, or the two acquiring operations may be performed in parallel.

Here, as a specific example of operation specified by an operation ID, a case is taken where an operation of checking a checkbox for an operation item "Use DB2 as a database" is performed. In this case, for the peripheral information acquired as a result of the above operation, examples of peripheral information based on error ID and operation ID include DB2 transaction log, DB2 table schema, and DB2 version data. Examples of peripheral information based only on error ID includes a list of processes which have accessed to a program module in which an error has occurred, the version data of this program module, data on the right of access to the program module and to a directory in which the program module exists, the amount of memory space, and the usage rate of CPU.

Meanwhile, there may be a case where, while the same error has occurred, a different operation has been performed before the occurrence of error (that is, before the acquisition of image data by the image acquiring unit 220). As an example, a case is taken where, while the same error as the above described case has occurred, the following two operations has been performed before the occurrence of error: Operation 1: check a checkbox for an operation item "Use DB2 as a database"; and Operation 2: no input to password field. Here, Operation 2 indicates negative content. Consequently, when a processing of inputting in password field is performed, this is not noted as an operation object of the peripheral information acquiring unit 230; when an operation of inputting in password field is not performed, this is noted as Operation 2.

In this case, in the operations at steps 808 to 810 illustrated in FIG. 8, the acquisition of peripheral information based on error ID and operation ID of Operation 1 and the acquisition of peripheral information based on error ID and operation ID of Operation 2 are performed. Accordingly, examples of peripheral information based on error ID and operation ID of Operation 1 include DB2 transaction log, DB2 table schema, and DB2 version data. Examples of peripheral information based on error ID and operation ID of Operation 2 include the value of password field. Examples of peripheral information based only on error ID include a list of processes which have accessed to a program module in which the error has occurred, the version data of this program module, data on the right of access to the program module and to a directory in which the program module exists, the amount of memory space, and the usage rate of CPU.

Continuing to refer to FIG. 8, when only an operation ID has been acquired (No at step 803 and Yes at step 811), subsequently, the peripheral information acquiring unit 230 consults the key table 241 to acquire the record ID of a record in which the acquired operation ID has been registered (step 812). Then, the peripheral information acquiring unit 230 consults the peripheral information table 243 to acquire a peripheral information ID corresponding to the record ID acquired at step 812 (step 813). Then, the peripheral information acquiring unit 230 consults the peripheral information definition table 244 to acquire peripheral information by use of a peripheral information acquiring method registered in the table 244, corresponding to the peripheral information ID acquired at step 813 (step 814).

Here, as a specific example of operation specified by an operation ID, a case is taken where an operation of clicking an OK button object displayed by program A is performed. In this case, examples of peripheral information acquired as a result of the above operation, include the log of program A, all the processes executed by program A, the amount of memory space, and the usage rate of CPU.

Referring to FIG. 8, when neither an error ID nor an operation ID has been acquired (No at step 803 and No at step 811), there is not peripheral information to be acquired and thus the processing by the peripheral information acquiring unit 230 is finished without any acquisition of peripheral information.

The captured image processing unit 250 adds the peripheral information thus acquired to the image data acquired by the image acquiring unit 220. Then, the image data with the peripheral information added thereto is stored in the monitoring data retaining unit 300. However, when peripheral information has not been acquired by the peripheral information acquiring unit 230 (referring to FIG. 8, No at steps 803 and 811), there is no processing by the captured image processing unit 250, and image data with no peripheral information added thereto is stored in the monitoring data retaining unit 300.

When a person in charge of test result analysis reads monitoring data to analyze the test result, image data with peripheral information added thereto is read out as the monitoring data on the analyzed software from the monitoring data retaining unit 300 and is displayed on the display device 400. Here, displayed on the display device 400 is peripheral information as well as an image obtained as a result of saving a screen image displayed when the software is executed.

Figure 9A:
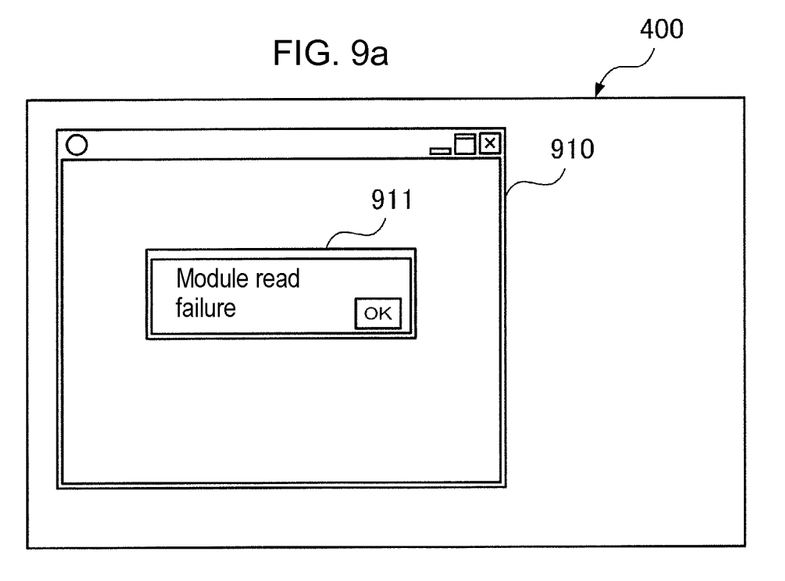
FIGS. 9a-9b present a diagram illustrating an example of monitoring data according to the present embodiment.
Figure 9B:
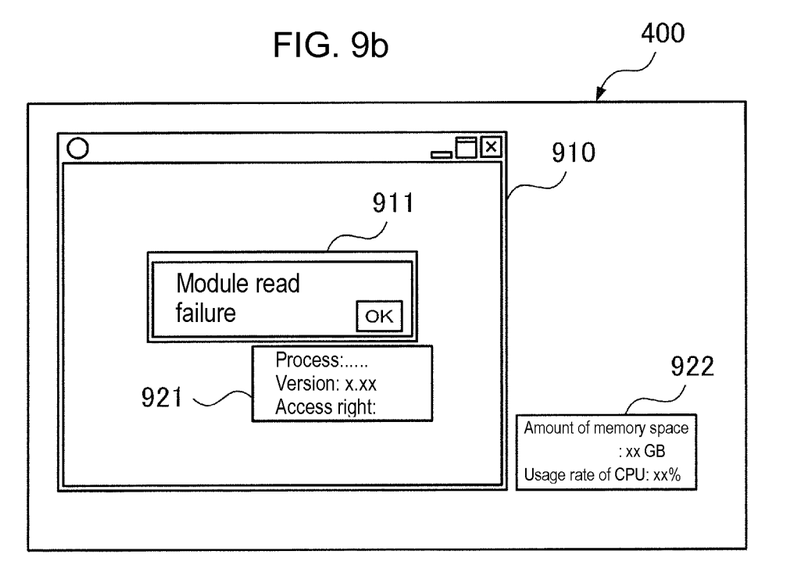

FIGS. 9a-9b present a diagram illustrating an example of monitoring data.

FIG. 9a is a diagram illustrating an example of screen image saved by the image acquiring unit 220; and FIG. 9b is a diagram illustrating an example of image with peripheral information added thereto. In the example illustrated in FIG. 9b, on the window 910 in which the screen image by the monitored software is displayed, the test box 921 in which module information being peripheral information is described is displayed below the error message 911. Further, in the right side of the window 910 itself, the text box 922 is displayed in which hardware data, that is, the amount of memory space and the usage rate of CPU are described.

Exemplary Hardware Configuration

Figure 10:
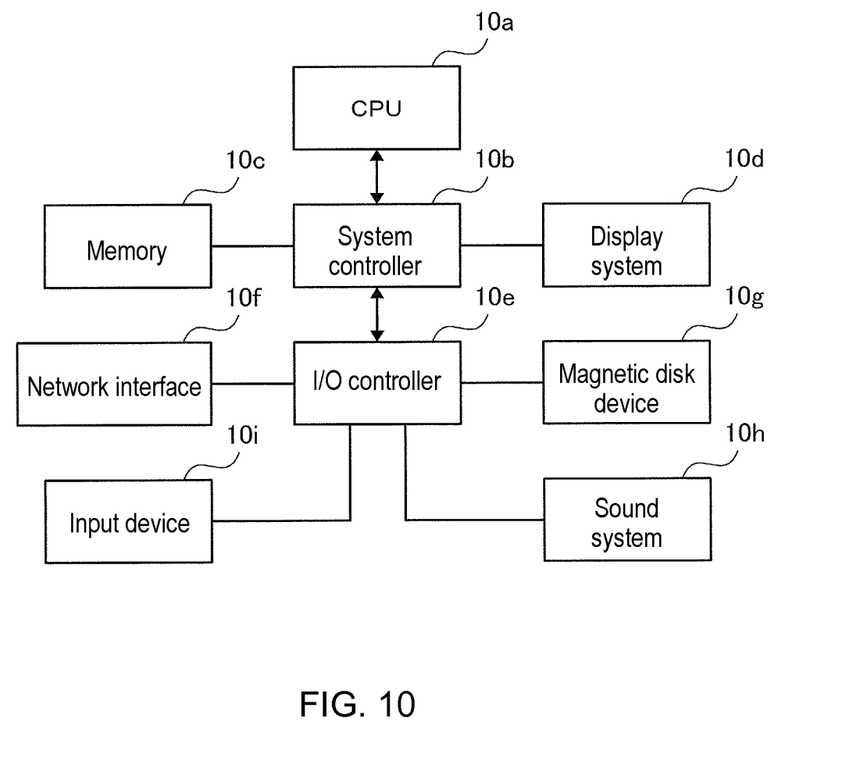
FIG. 10 is a diagram illustrating an exemplary configuration of hardware suitable for constructing the computer system according to the present embodiment.

FIG. 10 is a diagram illustrating an exemplary configuration of hardware suitable for constructing a computer system according to the present embodiment.

The computer illustrated in FIG. 10 includes a CPU (Central Processing Unit) 10a being a calculating means and a memory 10c being a main storage means. Further included as an external device are a magnetic disk device (HDD: Hard Disk Drive) 10g, a network interface 10f, a display system 10d, a sound system 10h and an input device 10i such as a keyboard and a mouse.

In the exemplary configuration illustrated in FIG. 10, the memory 10c and the display system 10d are connected via a system controller 10b to the CPU 10a. The network interface 10f, the magnetic disk device 10g, the sound system 10h and the input device 10i are connected via an I/O controller 10e to the system controller 10b. These constituent components are connected by use of a variety of buses such as system buses and input/output buses.

FIG. 10 is simply an illustrative example of hardware configuration of a computer suitable for application of the present embodiment. The present embodiment may be widely applied to systems which monitor the operation of monitored software, and acquire and hold peripheral information at a specific time; thus, implementation of the present embodiment is not limited to the illustrated configuration.

Referring to FIG. 10, OS and application software programs are stored in the magnetic disk device 10g. These programs are read into the memory 10c and executed by the CPU 10a, whereby respective functions of the software executing unit 100 and the software monitoring unit 200 according to the present embodiment are implemented. The peripheral information DB 240 and the monitoring data retaining unit 300 are implemented by the storage means such as the memory 10c or the magnetic disk device 10g. The operation history of monitored program is also held by the memory 10c or the like. The display device 400 constitutes the display system 10d.

As described herein and according to the present invention, the above object is achieved by implementing the following apparatus: that is, an apparatus for monitoring software execution comprises an executing unit executing monitored software and a monitoring unit monitoring execution of the monitored software by the executing unit. The monitoring unit includes: an image acquiring unit acquiring image data of a display screen image displayed on a display device when the executing unit executes the software; a peripheral information acquiring unit acquiring peripheral information being information on the state of the software and hardware in which the software is executed, at the time of acquisition of the image data by the image acquiring unit; and a captured image processing unit adding the peripheral information to the image data so that, when an image based on the image data acquired by the image acquiring unit is displayed on the display unit, the content of the peripheral information acquired by the peripheral information acquiring unit is displayed along with the image.

Preferably, when an error has occurred during execution of the software by the executing unit at the time of the image data acquisition by the image acquiring unit, the peripheral information acquiring unit acquires, depending on the kind of the error, information predetermined as peripheral information to be acquired on the occurrence of that kind of error.

In the above apparatus, the monitoring unit may further include an operation history acquiring unit acquiring history data on operation for execution of the software by a user. In this case, when it is determined, based on the history data acquired by the operation history acquiring unit, that a specific operation has been performed during a predetermined period of time before the image data acquisition by the image acquiring unit, the peripheral information acquiring unit acquires information predetermined as peripheral information to be acquired when that specific operation has been performed.

More specifically, when the file format of the image data has an area for storing a text, the captured image processing unit describes the peripheral information in the area, thereby adding the peripheral information to the image data.

Alternatively, the captured image processing unit inserts an image representing the peripheral information into the image based on the image data, thereby adding the peripheral information to the image data.

The present invention is also implemented as the following method: that is, a method for allowing a computer to execute software and for monitoring software execution, the method comprising: a step of acquiring image data of a display screen image displayed on a display device when monitored software is executed; a step of acquiring peripheral information being information on the state of the software and hardware in which the software is executed at the time of acquisition of the image data; and a step of adding the peripheral information to the image data and storing the image data having the peripheral information added thereto into a storage device, so that, when an image based on the image data is displayed on the display unit, the content of the peripheral information acquired by the peripheral information acquiring unit is displayed along with the image.

The present invention is also implemented as a program controlling a computer to implement the functions of the above described apparatus, or as a program allowing a computer to execute processing corresponding to the above described steps. This program may be stored, for distribution, in a magnetic disk, an optical disk, a semiconductor memory, or other storage media, or may be distributed via a network.

According to the present invention, it is possible to easily acquire information for identifying a specific situation at the time of problem occurrence during software execution along with peripheral information on the situation.

The present invention thus facilitates identification of a problem area and production of a problem report, and to implement problem report production by which a person reading the problem report can comprehend a problem area intuitively and easily.

In one embodiment presented herein, included are a software executing unit 100 and a software monitoring unit 200 monitoring software execution by the software executing unit 100. The software monitoring unit 200 includes: an image acquiring unit 220 acquiring image data of a screen image displayed on a display device 400 when the software executing unit 100 executes the software; a peripheral information acquiring unit 230 acquiring peripheral information being information on the state of the software and hardware, at the time of acquisition of the image data by the image acquiring unit 220; and a captured image processing unit 250 adding the peripheral information to the image data so that the content of the peripheral information acquired by the peripheral information acquiring unit 230 is displayed along with an image based on the image data acquired by the image acquiring unit 220.

Note that, in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for monitoring software execution, the apparatus comprising:
    a hardware executing unit executing monitored software; and
    a hardware monitoring unit monitoring execution of the monitored software by the hardware executing unit,
    wherein the hardware monitoring unit comprises:
    an image acquiring unit acquiring image data of a screen image displayed on a display device while the hardware executing unit executes the monitored software;
    a peripheral information acquiring unit acquiring peripheral information, wherein the peripheral information is information on a state of software and hardware in which the monitored software is executed, and wherein the peripheral information describes the state of the software and the hardware at a time of acquisition of the image data by the image acquiring unit; and a captured image processing unit adding the peripheral information to the image data so that, in response to an image based on the image data acquired by the image acquiring unit being displayed on the display device, content of the peripheral information acquired by the peripheral information acquiring unit is displayed with the screen image, wherein, in response to an error occurring during execution of the software by the executing unit at a time of the image data acquisition by the image acquiring unit, the peripheral information acquiring unit acquires, depending on an error type of the error, information predetermined as peripheral information to be acquired in response to an occurrence of that error type, and wherein, in response to a determination, based on history data acquired by the operation history acquiring unit, that a specific operation has been performed during a predetermined period of time before the image data acquisition by the image acquiring unit, then the peripheral information acquiring unit acquires information predetermined as peripheral information to be acquired when that specific operation is performed.

2. The apparatus according to any of claim 1, wherein, in response to a file format of the image data having an area for storing a text, the captured image processing unit describes the peripheral information in the area, thereby adding the peripheral information to the image data.

3. The apparatus according to claim 1, wherein the captured image processing unit inserts an image representing the peripheral information into the screen image based on the image data, thereby adding the peripheral information to the image data.

4. An apparatus for monitoring software execution, the apparatus comprising:
    a hardware executing unit executing monitored software; and
    a hardware monitoring unit monitoring execution of the monitored software by the hardware executing unit,
    wherein the hardware monitoring unit comprises:
    an operation history acquiring unit acquiring history data on operations for execution of software used by a user;
    an image acquiring unit acquiring image data of a screen image displayed on a display device in response to the hardware executing unit executing the software;
    a peripheral information acquiring unit acquiring peripheral information, wherein the peripheral information is information on a state of the software and hardware in which the software is executed, and wherein the peripheral information describes the state of the software and hardware at a time of acquisition of the image data by the image acquiring unit; and
    a captured image processing unit adding the peripheral information to the image data so that, in response to an image based on the image data acquired by the image acquiring unit being displayed on the display device, content of the peripheral information acquired by the peripheral information acquiring unit is displayed along with the image, wherein, in response to an error occurring during execution of the software by the executing unit at a time of the image data acquisition by the image acquiring unit, the peripheral information acquiring unit acquires, depending on an error type of the error, information predetermined as peripheral information to be acquired in response to an occurrence of that error type, and wherein, in response to a determination, based on history data acquired by the operation history acquiring unit, that a specific operation has been performed during a predetermined period of time before the image data acquisition by the image acquiring unit, then the peripheral information acquiring unit acquires information predetermined as peripheral information to be acquired when that specific operation is performed.

5. A computer implemented method to execute software and to monitor software execution, the method comprising:
    acquiring, by one or more processors, image data of a screen image displayed on a display device while monitored software is executed;
    acquiring, by one or more processors, peripheral information, wherein the peripheral information is a state of software and hardware in which the software is executed, at a time of acquisition of the image data; and
    adding, by one or more processors, the peripheral information to the image data and storing the image data having the peripheral information added thereto into a storage device, so that, in response to an image based on the image data being displayed on the display device, a content of the peripheral information acquired by the peripheral information acquiring unit is displayed along with the screen image, wherein, in response to an error occurring during execution of the software by the executing unit at a time of the image data acquisition by the image acquiring unit, the peripheral information acquiring unit acquires, depending on an error type of the error, information predetermined as peripheral information to be acquired in response to an occurrence of that error type, and wherein, in response to a determination, based on history data acquired by the operation history acquiring unit, that a specific operation has been performed during a predetermined period of time before the image data acquisition by the image acquiring unit, then the peripheral information acquiring unit acquires information predetermined as peripheral information to be acquired when that specific operation is performed.

* * * * *